Patented Aug. 3, 1954

2,685,523

UNITED STATES PATENT OFFICE 2,685,523

ASPHALTIC COATING COMPOSITION AND A PIPELINE COATED THEREWITH

Walter M. Cross, Jr., Forbes Cross, and Joseph G. Hawthorne, Kansas City, Mo., assignors to Kansas City Testing Laboratory, Kansas City, Mo., a corporation of Missouri No Drawing. Application September 12, 1950, Serial No. 184,524

7 Claims. (Cl. 106—14)

This invention relates to a protectively coated metal pipeline normally subject to corrosive pitting caused by contact with the earth and to a pipeline coating composition of a type that is primarily intended for use in coating the outer surfaces of oil and gas pipelines. An important object of the invention is the provision of a protectively coated pipeline and novel composition which will satisfactorily resist and withstand the destructive or deteriorative forces to which such protective pipeline coatings are generally exposed in use.

In the development of the present invention, four outstanding corrosion problems, or factors, have been considered and solved. These problems are as follows:

1. Corrosive pitting in the surface of the pipe due to electrolytic couples being set up in the pipe by lack of uniformity of the metal.
2. Chemical corrosion of the pipe where rust or its equivalent occurs.
3. Pitting of the pipe by electrolysis where the metal ions of the pipe travel to a cathode some distance away from the pipe.
4. Protection of the coating itself from damage by mold, fungus, algae and the like.

Each of the above corrosive factors is peculiar to the present art of laying pipelines in or on the earth. It has been observed, and is well known that these factors are quite different from the oxidative effects of sunlight, air and weathering. Hence, the problems of protecting pipelines against soil corrosion are in no way analogous to other corrosion problems.

There are other factors of corrosion that might be discussed and considered herein, but it is believed that the solution of the foregoing four problems with the coating which separates the pipe from other sources of corrosion, in effect, does more to protect pipe against corrosion than does any other coating composition that has yet been devised.

With respect to the first problem, the theory has previously been advanced that an electrolytic couple will be established by a carbon particle and certain metal particles in the surface of the pipe. This causes a flow of metal from one place to another and the consequent disintegration results in pitting. In accordance with the teachings of the present invention, high resistance to electricity is present in the coating. Thus a coating 0.04 inch thick has a resistance of 11 ohm-centimeters $\times 10^{12}$ thereby affording an excellent insulator. The fact that the coating is tightly bound to the surface of the pipe is further intended to give considerable protection against this type of corrosion by interfering with any electrical field set up outside the surface of the pipe.

The second problem, namely chemical corrosion, has been solved by the provision of a coating so constituted that it will react with acidic radicals, such as carbon dioxide, to form carbonates. The theory has previously been advanced that all pipe has a barrier layer of moisture closely adhering to its outer surface which remains present even under the application of hot coatings. This barrier layer of moisture contains carbon dioxide which promotes chemical corrosion. In accordance with the practice of the present invention, the composition of the coating is such that the carbon dioxide is converted into a carbonate thereby completely eliminating the moisture and protecting the junction between the coating and the pipe. Furthermore, the composition of the coating is such that a pH of 8 to 12 is maintained in the entire coating and this range has been found sufficient to prevent chemical corrosion in all instances.

The third problem of protection against electrolytic pitting by electrolysis of the pipe from an outside source has received a great deal of study. It has generally been found that if the coating has the desirable insulating characteristics of the present invention, electrolytic corrosion is eliminated as long as the coating is maintained continuously. To make certain of this desirable characteristic, the coatings of the present invention are pure and have no free carbon content nor are there free ions present which would promote the transmission of electricity.

A thick coating of pipeline covering having high insulating characteristics might conceivably be employed to prevent electrolytic pitting. However, in conformity with the practice of the present invention, it is possible to employ a much thinner coating than heretofore while at the same time obtaining results that are as resistant to the passage of electrolytic currents therethrough as are possible with much thicker coatings now generally available.

Consideration of the fourth problem required the development of a new protection for the pipeline coating itself. In order to maintain the coating and prevent it from deteriorating, its plasticity characteristics not only must be good but the coating must resist attack by such destructive elements as fungus, mold, algae and the like. Accordingly, the coating of the present invention comprises a novel composition of matter that has been devised to give complete protection by the inclusion therein of soluble compounds which prevent the growth of mold, fungus, algae and the like. In accordance with the invention, these soluble compounds contain metal ions and, being soluble, the metal ion is disbursed throughout the entire coating thereby obtaining complete protection.

According to the present invention there is now provided a metal pipeline which would normally be susceptible to corrosive pitting caused by the electrolytic action and chemically corrosive action of the earth but which is protected against such pitting by a coating of a composition comprising a plastic petroleum base asphaltic polymer and a quantity of an alkalizing material effective to maintain the pH of the composition between 8 and 12.

The coating which forms a part of the subject matter of the invention may be produced in two forms: first, it may take the form of a liquid in which the active composition is dissolved in high vapor pressure solvents. In this form the coating may be brushed or swabed onto the pipe and serves excellently as a priming coat. This also is an excellent protection for small lead lines and surface lines as well as for other types of field pipe. In the second form, the composition is a solid which may be melted and applied hot to the pipe in a conventional manner.

In accordance with the practice of the present invention, the improved coating has sufficient body that in many instances it will not be necessary to wrap it. For example, where the soil is clay or sand and does not contain sharp rocks, it will often be practical to employ the plastic coating only. However, the maximum of security may be obtained by wrapping the coating and thereafter sealing the wrapping in place by the application of an additional coating in liquid form. The plastic form of the composition is solid and does not flow in warm weather or become brittle in cold weather.

The coating compositions of the present invention have excellent plasticity characteristics. For example, a 230° F. melting point coating has a penetration of 1.0 at 10° F. and only a penetration of 45 at 70° F. At the other end of the range, a 335° F. melting point coating has a penetration of 1 at 20° F. and a penetration of 22 at 70° F. These characteristics give the coating good resistance to flow due to overburden and applying pressure while at the same time they afford the best resistance to cracking at low temperatures.

This same feature of plasticity is accompanied by strong cohesiveness to the pipe. The combined stress between the coating and the pipe due to expansion and contraction in no way displaces the coating and the latter may be applied in freezing weather without adverse results, although it will be preferable that no frost be present on the surface of the pipe at the time the coating is applied.

With the foregoing in mind, the chemical composition of the novel coating will now be described. In advance, it may be mentioned that basically the composition may be said to be composed of three components in the event it takes the form of a solid material, and four, in the event it takes the form of a liquid. Broadly these components may be classified as (a) a carrier or base, (b) an alkalizing agent, (c) other additive materials and (d) a solvent in the event the composition takes the liquid form.

The carrier

As a carrier we propose to employ a bituminous material obtained from long chain petroleum hydrocarbons. These bituminous materials or hydrocarbons are asphaltic in character but, as hereinafter described, are modified in order to have excellent plasticity and resistance characteristics.

The carrier may constitute air-blown asphalts or steam-reduced asphalts. It may comprise an asphalt-like or resinous polymer made from the purification of lubricating oils. Many of these latter are air blown during which dehydrogenation occurs.

The carrier may be an asphaltic type polymer in which the asphaltic polymer is a modified asphalt, such modification having changed the natural relationship of petrolene to asphaltene content and modified the size of the molecule in both. One type of carrier having a high melt point, a high penetration and a dry instead of an oily surface, may be obtained by the following procedure:

85% of straight run, uncracked Iola Kansas residual oil is mixed with 15% of cracked Iola residual oil, and this mixture is then air blown. The penetration of this product will be somewhat lower than that obtained by air blowing straight Iola residual oil and its surface will be somewhat brighter and drier. This eliminates the oiliness that is present in a coating made from the straight run Iola oil. What has been accomplished in this procedure is first the manufacture of a residual oil having smaller molecules by a cracking operation and second the mixing of this cracked oil, in desirable proportions, with the uncracked material having larger molecules. The subsequent polymerization of the two by air blowing gives quite a different product from that obtained by air blowing the straight run residual oil.

The asphaltic coating carrier may be synthesized by mixing desirable proportions of asphaltenes and petrolenes extracted from an asphaltic material. The asphaltic material can be a crude oil. This synthetic asphalt carrier is a reconstituted asphalt and its characteristics can be controlled. Thus 335 melt point asphalt at Iola contains approximately 38% asphaltenes which are insoluble in petroleum ether and 62% of petrolenes which are soluble in petroleum ether. These petrolenes may be further modified by separation with acetone extraction and extraction by other solvents. Accordingly these products can be made to meet varying requirements by re-assembling these various constituents in any desired proportions.

In another example, the asphaltic polymer of the carrier may be made by extracting asphaltenes from any petroleum asphalt and by then dissolving the asphaltenes in an organic solvent such as benzene, toluene, or xylene.

Likewise, the invention contemplates the employment of coal tar pitch as a carrier.

The asphaltic carrier may, if desired, contain a soluble bodying agent such as ethyl cellulose, rubber or rosin. Such a carrier may be made by dissolving both the bodying agent and the asphalt in a mutual solvent such as naphtha, toluol or benzol, as hereinafter more fully described.

In the case of coal tar pitch a soluble bodying agent such as ethyl cellulose, rubber or rosin may be employed and, if desired, the mixture dissolved in a mutual solvent.

The asphaltic carrier may also include an insoluble bodying agent comprising an adsorptive material such as fuller's earth, silica gel, diatomaceous earth, or the like, in order to obtain a dry, non-oily, surface caused by the adsorption of excess oils by the clays.

Thus it will be seen that the carrier may have other agents included therein for the purpose of improving or varying the characteristics of the carrier itself without departing from the scope or spirit of the invention.

The bituminous material which functions as the carrier may be partially oxidized, is of high specific gravity, has a high ASTM penetration for its melting point and may, if desired, have a high melting point.

The alkalizer

The general requirements for the alkalizing agents that are employed in the practice of the inventions are that they should be soluble in the hydrocarbons and in coal tar pitch as well as in solvents for hydrocarbons and coat tar pitch, such latter solvents including, for example, toluene, benzene and xylene.

An alkalizing agent having an organic base (the term "base" is used in the chemical sense that it turns litmus paper blue and has basic reactions) is intended to be used in practicing the invention. A number of examples of such agents will now be given:

a. Aliphatic and alkanol amines.
  1. Mono-, di-, tri-, and quaternary amines. Many of these are soluble in petroleum and coal tar, as for example, methylamine, ethylamine and propylamine.
  2. The alkanolamines such as mono-ethanolamine, di-ethanolamine and tri-ethanolamine, the corresponding propanolamines, and higher homologues.
b. Hydrazines. An example is phenylhydrazine. This chemical has a double action in that it alkalizes and also has an anti-bacterial action.
c. The aniline series of chemicals and homologs.
  1. Aniline oil
  2. Toluidine
  3. Xylidine
d. Pyridine bases.
  1. Pyridine
  2. Piperidine (which even absorbs carbon dioxide from the air)
  3. Collidine
e. Acridine (also has an insecticidal action).
f. Vegetable alkaloids.
  1. Quinine
  2. Morphine While some of the foregoing are more suitable, from a practical standpoint, than others, all of them may be used in the practice of the invention.

The alkalizer is employed in such quantity as to impart a pH in excess of 7.5, preferably of from about 8.0 to 10.0 which will require from 1% to about 5% by weight of the coating composition as will further appear from the examples hereinafter set forth.

If desired, an alkalizing agent that is not soluble in the bituminous material of the carrier may be employed either as the sole alkalizer or as a further alkalizer or additive in addition to the soluble alkalizer. Thus, a finely divided calcareous material, by which term is included Portland cement, limestone, sodium carbonate, sodium silicate and similar materials. Such materials are particularly effective if in powdered or granular form of sufficiently small particle size to insure suspension in the carrier or coating. Materials of this nature may be employed in amounts of from 1% to 30% by weight of the coating composition and serve as bodying agents in addition to imparting the desired degree of alkalinity to the hydrocarbon or asphaltic base or carrier.

Other additive materials

Generally these materials comprise protective agents the principal requirement of which is to serve as a fungicide and insecticide. In keeping with the teachings of the invention they comprise metal compounds that are soluble in the carrier (asphalt or coal tar).

There are a large number of such compounds. A sufficient number of examples of them that constitute a fair representation of the class follow:

1. A salt of an insecticidal metal of naphthenic acid of the general formulae, $C_nH_{2n-2}O_2$, $C_nH_{2n-4}O_2$, $C_nH_{2n-6}O_2$. Copper, lead and tin salts of these naphthenic acids are very effective. The stress lies on the insecticidal value of the metal. Lead naphthenate has the added advantage of acting as a drying agent for the coating.

2. Another group of metal salts which are soluble in petroleum are salts of the oleates. Examples of these are copper oleate, $Cu(C_{18}H_{33}O_2)_2$, lead oleate, $Pb(C_{18}H_{33}O_2)_2$ and tin oleate $Sn(C_{18}H_{33}O_2)_2$.

3. Another group of metal salts soluble in petroleum and benzol are the stearates. These are metal salts of stearic acid having the formula: $C_{18}H_{36}O_2$. The copper, lead and tin salts of these soaps are all satisfactory examples.

4. Another group of metal salts are those of palmitic acid, $C_{18}H_{32}O_2$. Copper, lead and tin salts of these soaps are good examples.

Although, as stated, the fungicidal metallic compound is preferably present in solution in the carrier (and the coating) it may also be in suspension. Compounds of metals such as copper, zinc, arsenic, lead, selenium, silver, cadmium, tin, antimony, gold, mercury, bismuth or the like which form insoluble compounds with protoplasmic and protein substances are suitable for this purpose. Additionally the sodium, potassium and calcium salts of chlorphenols are effective insecticides and their employment in the present invention is contemplated. Mono and dichlorphenols are effective but pentachlorphenols are to be preferred.

Although the exact percentage of the insecticide or fungicide by weight of the coating composition will be found to vary according to the type of compound employed it will be somewhere within the preferred range of 0.5 to 5.0%.

To enhance the effectiveness of the coating composition for certain purposes, such as to protect against certain forms of fungus, algae and incrustations such as barnacles, the use of additive active halogenated organic compounds is contemplated, such for instance as are commonly sold under trade names "Velsicol 1068" and "Octaklor" which are active halogenated hydrocarbon substances having the empirical formulae $C_{10}H_6Cl_8$. In the claims the term "active halogen" refers to a halogen held in a fungicidally or insecticidally active state in a halogenated product.

When the coating is to be applied to damp or wet surfaces it preferably includes a surface tension modifying agent, otherwise known as a wetting agent, to make the coating adhere readily to such surfaces. The amines included in our coating as above described may have some surface tension modifying effect but where more pronounced results are desired we add sulfonated alcohols or other amines such as high weight aliphatic amines, including hexamethylamine, decylethylamine and octylpropanolamine, including the salts of these amines. Agents of this nature are effective in quantities ranging from .02% to 1% and in instances even permit the coating of a surface under water.

The invention contemplates the addition of an inhibitor to prevent rusting of the coated surface. This inhibitor may be potassium dichromate, sodium dichromate or magnesium dichromate. Sodium dichromate is preferred because of low cost. This compound is an oxidation inhibitor and prevents rusting. It is not soluble in hydrocarbons and thus must be dispersed uniformly throughout the coating as a solid.

*Examples of suitable coating compositions according to the invention*

For the petroleum polymer with an alkalizing agent and a solvent (parts by weight):

Petroleum base asphaltic polymer _____ 50
Triethanolamine _____ 2
V. M. P. Naphtha _____ 20
Toluol _____ 28

For the petroleum polymer and an alkalizing agent and a protective agent, a typical formula is by weight:

Petroleum base asphaltic polymer _____ 50
Triethanolamine _____ 1
Copper oleate _____ 1
V. M. P. Naphtha _____ 20
Benzol _____ 28

For the petroleum polymer with an alkalizing agent and a protective agent and a soluble embodying agent:

Petroleum base asphaltic polymer _____ 40
Ethyl cellulose _____ 10
Aniline oil _____ 2
Lead naphthenate _____ 1
V. M. P. Naphtha _____ 20
Benzol _____ 27

For an example of the embodied petroleum polymer carrier:

Petroleum base asphaltic polymer _____ 35
Fuller's earth _____ 15
Monoethanolamine _____ 2
Copper naphthenate _____ 2
V. M. P. Naphtha _____ 25
Toluol _____ 21

For a coal tar coating properly alkalinized:

Coal tar pitch _____ 80
Finely ground silica (bodying agent) _____ 18
Methylamine _____ 2

The coal tar itself carries fungicidal protecting agents and only needs the alkalizing agents for improvement. Likewise it has a hard surface so that driers are not needed. It flows very easily and a bodying agent is therefore important.

The petroleum polymer carrier without a solvent:

Petroleum base asphaltic polymer of 250° melt point (ring and ball) penetration 35_ 95
Copper oleate _____ 2.5
Triethanolamine _____ 2.5

Another typical coating is as follows:

Petroleum base asphaltic polymer _____ 50
Triethanolamine _____ 1
Portland cement _____ 3
Copper oleate _____ 0.5
V. M. P. Naphtha _____ 25
Dichloro-diphenyl-trichlorethane _____ 2.5
Benzol $C_6H_6$ _____ 18

In compounding the composition the petroleum carrier is first liquified either by melting or by dissolving in a suitable solvent as described, and the other materials are added, with agitation.

In applying the coating composition to a pipeline or the like, it may be melted or dissolved in a suitable solvent such as above described, after which the composition may readily be painted on. As the composition is solid at normal temperatures it need merely be allowed to dry or cool, depending on the mode of application, to form the finished protective coating. As an added precaution the coating, before it has hardened, may be dusted with Portland cement or some other calcareous material. Although the coating remains solid throughout a wide range of temperatures, it does not become hard and brittle, nor chip off the pipe on cooling, as is the case with many prior coatings. On the contrary it is not brittle in character even under temperatures as low as 0° F.

Our coating has an alkaline effect at the place where it does the most good, namely, where carbon dioxide exists in the surface of the pipe. Likewise the acidic effects of the bicarbonates of sodium and calcium, releasing carbon dioxide, and of rain water, which contains carbon dioxide and has a low pH, are overcome as are the acid effects of the hydrolysis of chlorides and brine so that our coating is especially well adapted for use in alkali earth areas and in ocean waters.

Although the composition has been disclosed and described herein with particular reference to its suitability for use in coating oil and gas pipelines, and was primarily designed for that purpose, it will be appreciated that it may also be employed in other uses or fields such, for example, as in coating the hulls of ships, the surfaces of gas and oil tanks, and the like, without departing from the spirit of the invention as disclosed herein and as set forth in the appended claims.

As already set forth, it is contemplated that the coating will be marketed in both solid and liquid form. Additionally, the invention contemplates the preparation of a concentrate which may be sold to users who have their own asphalt materials for use as a carrier and who can practice the invention by adding the concentrate. Such a concentrate would have the following formula:

Petroleum polymer (330 melt point, 20 penetration—by weight) _____ 80
Diethanolamine _____ 10
Copper Naphthenate _____ 5
Chlordane ($C_{10}H_6Cl_8$) _____ 5

Where the special insecticidal value of chlordane is not desired in the above formula, the chlordane may be replaced, for instance, by lead naphthenate. The concentrate may be mixed in the proportion of 10% to 25%, by weight, with a carrier material such as air-blown or steam-reduced asphalt to make the coating.

The primary reason for adding a solid alkalizer (calcium oxide for example) to the mixture containing the soluble alkalizer is to obtain a good bodying effect. It is less expensive to employ the solid alkalizers cited but the soluble alkalizer is the most positive in its action.

One composition which we have found to be especially suitable for use as a pipeline coating composition comprises a plastic asphaltic polymer having a melting point (ball and ring) between 230 degrees F. and 335 degrees F. and a penetration (ASTM) between 22 and 46 at 70 degrees F. an alkanol amine from the group consisting of monoethanolamine, diethanolamine and triethanolamine. This composition very successfully resists electrolytic and chemical corrosion due to contact of the coated pipe with the earth.

Although it would be possible to continue indefinitely the recitation of formulae by permutations and combinations, we are convinced that those which have been given above as illustrative are sufficient and will enable persons skilled in the art to practice the invention without difficulty. Also, although enough bituminous materials, alkalizers, insecticides, inhibitors, wetting agents and the like have been enumerated and discussed to constitute a fair representation of the entire class of such agents, it will be appreciated and understood that in appropriate instances others may be substituted for those mentioned without departing from the scope of the invention as set forth in the claims appended hereto.

For purposes of record, this application is a continuation, in part, of our copending and abandoned application Serial No. 18,726 filed April 2, 1948, which in turn was a continuation in part of our copending application Serial No. 743,450 filed April 23, 1947, entitled "Protective Coatings and Method."

Having thus described our invention, what we claim as new and desire to secure by Letters Patent of the United States is:

1. A metal pipeline normally susceptible to corrosive pitting caused by electrolytic action and chemical corrosion, the surface of said pipeline being coated with a composition comprising a plastic petroleum base asphaltic polymer and a quantity of a basic amino compound soluble in said polymer effective to maintain the pH of the composition between 8 and 12, said composition serving to substantially prevent said corrosive pitting in said pipeline.

2. A metal pipeline normally susceptible to corrosive pitting caused by electrolytic action and chemical corrosion, the surface of said pipeline being coated with a composition comprising a plastic petroleum base asphaltic polymer and a quantity of a lower alkanol amine soluble in said polymer effective to maintain the pH of the composition between 8 and 12, said composition serving to substantially prevent said corrosive pitting in said pipeline.

3. A metal pipeline normally susceptible to corrosive pitting caused by electrolytic action and chemical corrosion, the surface of said pipeline being coated with a coating composition comprising essentially a plastic petroleum base asphaltic polymer having a melting point (ball and ring) between 230 degrees F. and 335 degrees F. and a penetration (ASTM) between 22 and 46 at 70 degrees F. and from 1% to 5% by weight of triethanolamine, said quantity of triethanolamine being effective to maintain the pH of the composition between 8 and 12, said composition serving to substantially prevent said corrosive pitting and chemical corrosion in said pipeline.

4. A pipeline coating composition comprising essentially a petroleum base asphaltic polymer having a melting point (ball and ring) between 230 degrees F. and 335 degrees F. and a penetration (ASTM) between 22 and 46 at 70 degrees F. and a quantity of a lower alkanol amine soluble in said polymer effective to maintain the pH of said composition between 8 and 12.

5. A pipeline coating composition comprising essentially a petroleum base asphaltic polymer having a melting point (ball and ring) between 230 degrees F. and 335 degrees F. and a penetration (ASTM) between 22 and 46 at 70 degrees F. and a quantity of triethanolamine soluble in said polymer effective to maintain the pH of said composition between 8 and 12.

6. A composition of matter comprising essentially a petroleum base asphaltic polymer having a melting point (ball and ring) between 230 degrees F. and 335 degrees F. and a penetration (ASTM) between 22 and 46 at 70 degrees F., an alkanol amine from the group consisting of monoethanolamine, diethanolamine and triethanolamine and a petroleum soluble copper salt of an acid from the group consisting of napthenic acids and higher fatty acids.

7. A pipeline coating composition comprising essentially a petroleum base asphaltic polymer having a melting point (ball and ring) between 230 degrees F. and 335 degrees F. and a penetration (ASTM) between 22 and 46 at 70 degrees F. and a quantity of a basic amino compound soluble in said polymer effective to maintain the pH of said composition between 8 and 12.

References Cited in the file of this patent

UNITED STATES PATENTS

| Number | Name | Date |
| --- | --- | --- |
| 1,404,511 | Bullock | Jan. 24, 1922 |
| 2,129,659 | Easling | Sept. 13, 1938 |
| 2,340,640 | Burk | Feb. 19, 1944 |
| 2,369,219 | Doyle | Feb. 13, 1945 |
| 2,465,960 | Berge | Mar. 29, 1949 |
| 2,478,162 | Sommer | Aug. 2, 1949 |

FOREIGN PATENTS

| Number | Country | Date |
| --- | --- | --- |
| 11,687 | Great Britain | of 1899 |

OTHER REFERENCES

Gregory, "Uses and Applications of Chemicals and Related Materials," vol. II (1944), pages 86 and 87.

Abraham, "Asphalts and Allied Substances" (1945), vol. I, page 592; vol. II, pages 1680 and and 1681.